US006705017B2

(12) United States Patent
Ellis et al.

(10) Patent No.: US 6,705,017 B2
(45) Date of Patent: Mar. 16, 2004

(54) ASSEMBLY OF FOOT AND RECIPROCATING SAW

(75) Inventors: Brian Joseph Ellis, Mundelein, IL (US); Eric Robert Larson, Vernon Hills, IL (US); Stephen Michael Oshgan, Mount Prospect, IL (US); Cornelis Johannes Maria Van Dun, Galder (NL); Jan Peter Houben, Poppel (BE)

(73) Assignee: Skil Europe B.V., Breda (NL)

( * ) Notice: Subject to any disclaimer, the term of this patent is extended or adjusted under 35 U.S.C. 154(b) by 24 days.

(21) Appl. No.: 09/843,461

(22) Filed: Apr. 25, 2001

(65) Prior Publication Data

US 2002/0095798 A1 Jul. 25, 2002

(30) Foreign Application Priority Data

Jan. 19, 2001 (NL) .............................. 1017155

(51) Int. Cl.[7] .............................. B23D 49/16
(52) U.S. Cl. ...................................... 30/375
(58) Field of Search ................. 30/376, 375, 327, 30/392, 394, 371, 374

(56) References Cited

U.S. PATENT DOCUMENTS

| 3,186,454 A | * | 6/1965 | Kohler et al. ............... 30/375 |
| 3,938,251 A |   | 2/1976 | Kareman |
| 5,644,845 A | * | 7/1997 | Durr et al. ................. 30/376 |

FOREIGN PATENT DOCUMENTS

EP            0985481 A        3/2000

OTHER PUBLICATIONS

International Search Report prepared by the European Patent Office on Sep. 7, 2001.

* cited by examiner

Primary Examiner—Douglas D. Watts
(74) Attorney, Agent, or Firm—Gardner Carton & Douglas LLP

(57) ABSTRACT

An apparatus having a foot, a reciprocating saw and a housing. Between the foot and the housing there are means for releasable mounting the foot on the housing, characterized in that the releasable mounting means have a first coupling member connected to the foot and, co-acting therewith, a second coupling member connected to the housing. The coupling members can be carried from a disconnected to a connected position by a relative displacement between the foot and housing.

19 Claims, 5 Drawing Sheets

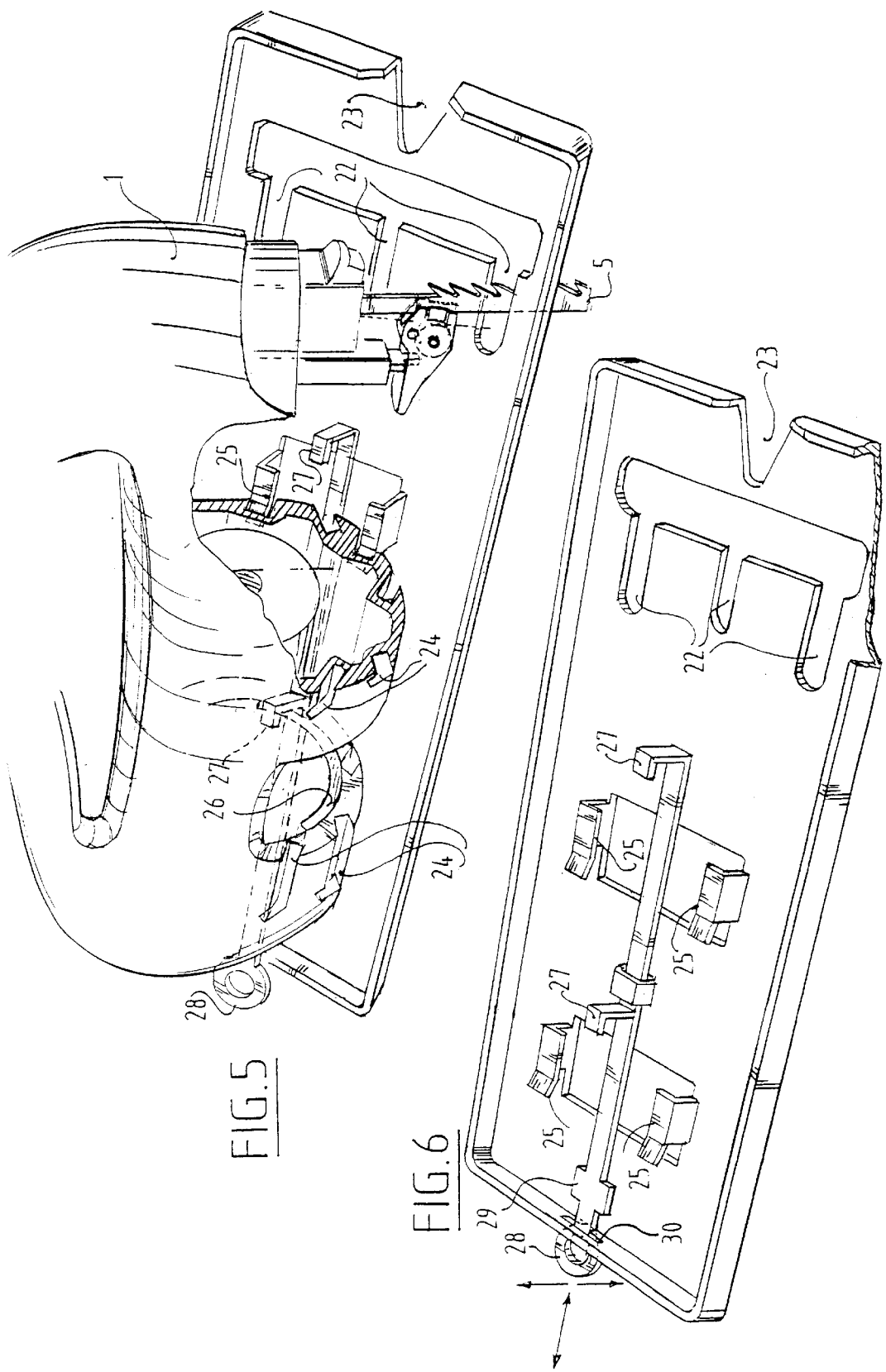

ASSEMBLY OF FOOT AND RECIPROCATING SAW

FIELD OF THE INVENTION

The present invention relates to an assembly of a foot and a reciprocating saw provided with a housing, wherein between the foot and the housing there are provided means for releasable mounting of the foot on the housing.

Because the foot can be mounted releasably on the housing of a reciprocating saw, the foot can be replaced by another foot or the foot can be mounted on the housing in different positions.

BACKGROUND OF THE INVENTION

Assemblies known from the prior art consisting of a foot and a reciprocating saw contain mounting means which have to be attached and released by means of an external tool such as a screwdriver. The drawback here is that exchanging the foot or mounting thereof in a different position on the housing takes quite a lot of time. In addition, such a tool is not always (immediately) ready to hand.

SUMMARY OF THE INVENTION

The invention has for its object to provide an improved assembly consisting of a foot and a reciprocating saw, wherein mounting of the foot on the housing can take place quickly and efficiently. For this purpose the assembly is characterized according to the invention in that the releasable mounting means comprise a first coupling member connected to the foot and, co-acting therewith, a second coupling member connected to the housing, wherein the coupling members can be carried from a disconnected to a connected position by a relative displacement between foot and housing.

In such an assembly the foot can be mounted on or released from the housing of a reciprocating saw by a simple movement. The convenience of use of the assembly is herein increased.

In a preferred embodiment the first coupling member comprises a hook-like element and the second coupling member comprises a slot arranged in the housing. The hook-like element is connected into the slot of the housing by a relative displacement between foot and housing.

When a number of slots co-acting with the hook-like element are provided in longitudinal direction of the housing, it is possible to mount the foot at different positions on the reciprocating saw in longitudinal direction thereof.

By additionally or alternatively providing a number of slots co-acting with the hook-like element of the foot in transverse direction of the housing, it becomes possible to mount the foot at different positions on the housing of the reciprocating saw in transverse direction thereof.

The assembly is preferably further provided with support means to support the foot at a desired angle relative to the housing. This will enable the reciprocating saw to rest properly on the foot, wherein the releasable mounting means are relieved of load.

In a preferred embodiment the desired angle is a predetermined angle, which preferably amounts to 0°, −45° and 45°, which are in practice the most frequently occurring angles at which sawing takes place.

The support means preferably comprise two ribs connected to the foot and extending substantially in longitudinal direction of the foot. By making the distance between the ribs as great as possible, a broad support and therefore a stable position of the reciprocating saw are obtained.

In order to further increase the stability of the reciprocating saw the support means preferably comprise grooves which are arranged in the housing and extend in longitudinal direction and in which the ribs of the foot are placed.

In a particularly advantageous embodiment the support means and the releasable mounting means are integrated.

The invention also relates to a foot and a reciprocating saw which are provided with the above stated measures.

BRIEF DESCRIPTION OF THE DRAWINGS

The invention will now be further elucidated with reference to the annexed drawings. In the drawings:

FIG. 5 is a perspective view of a mounted assembly according to a third embodiment, and FIG. 6 is a perspective view of the foot of the assembly of FIG. 5.

DETAILED DESCRIPTION OF THE INVENTION

Figure 1:
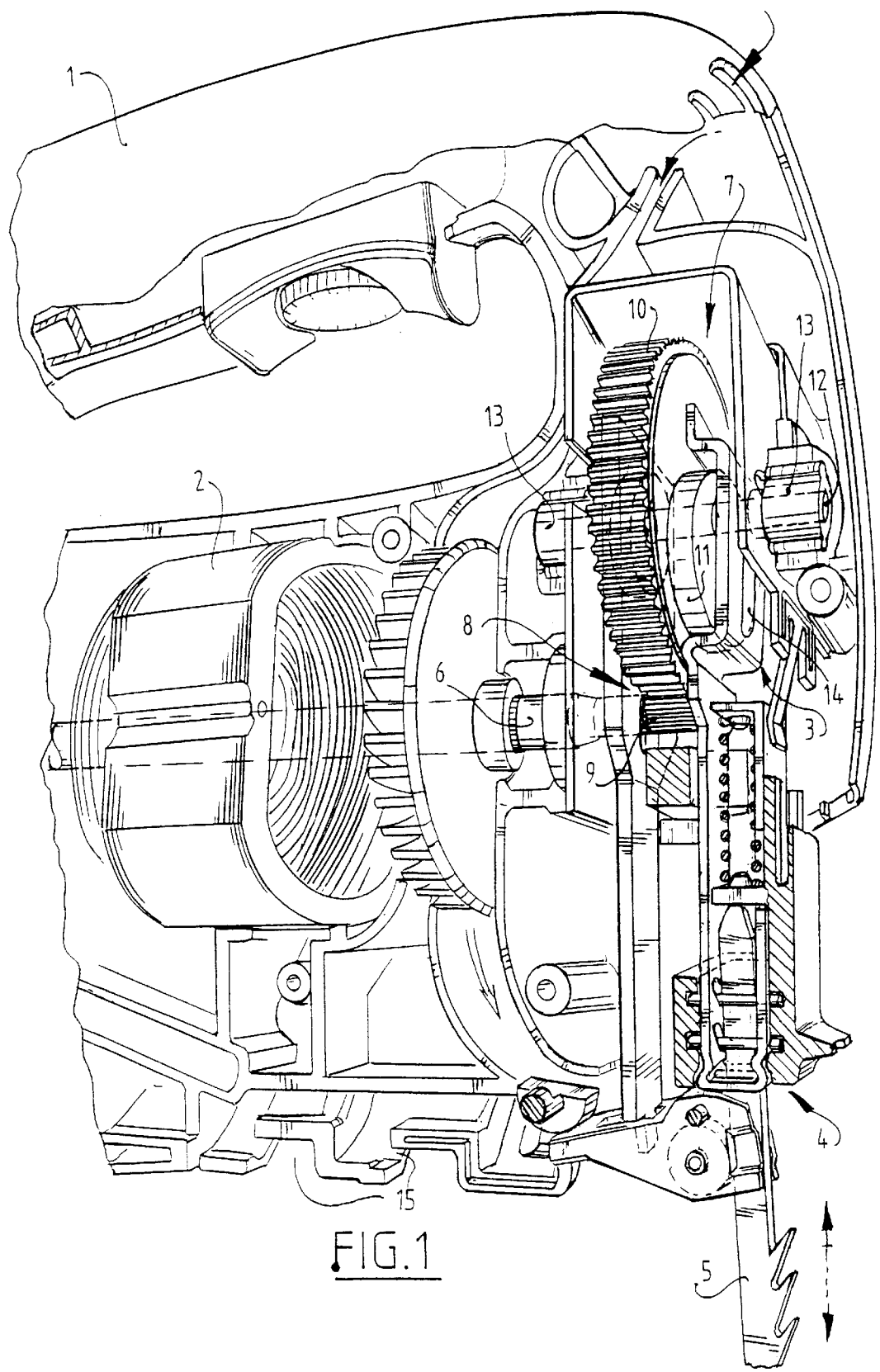
FIG. 1 shows a perspective view of a reciprocating saw with a part of the housing broken away.

The reciprocating saw shown in FIG. 1 is provided with a housing 1, part of which is broken away in the drawing to provide a view of the inside of the reciprocating saw. Arranged in housing 1 is an electric motor 2 for driving a drive shaft 3 which bears on its lower end a holder 4 for a saw blade 5. Electric motor 2 is provided with a motor shaft 6. Conversion means 7 are arranged between motor shaft 6 and the drive shaft 3 for saw blade 5 for converting the rotating movement of electric motor 2 into a reciprocating movement of saw blade 5. Conversion means 7 comprise a gear transmission 8, consisting of a first toothed wheel 9 connected to motor shaft 6 and a second toothed wheel 10 co-acting therewith, and an eccentric 11 arranged on second toothed wheel 10. The eccentric 11 co-acts with drive shaft 3 in order to convert the rotating movement of the second toothed wheel 10 into a reciprocating movement of saw blade 5.

The second toothed wheel 10 is supported rotatably in housing 1 by means of a gear shaft 12. This latter is rotatably mounted in bearings 13 on either side of the second toothed wheel 10. Gear shaft 12 herein extends through an opening 14 arranged in drive shaft 3.

Often mounted on the reciprocating saw shown in FIG. 1 on the underside of housing 1 is a foot which provides support and guiding for the reciprocating saw during sawing. The foot has a flat bottom on the underside. The foot can be placed with this flat bottom onto a workpiece for sawing and pushed thereover, while the user can concentrate on saw blade 5 so as to obtain the desired sawing pattern.

Figure 2:
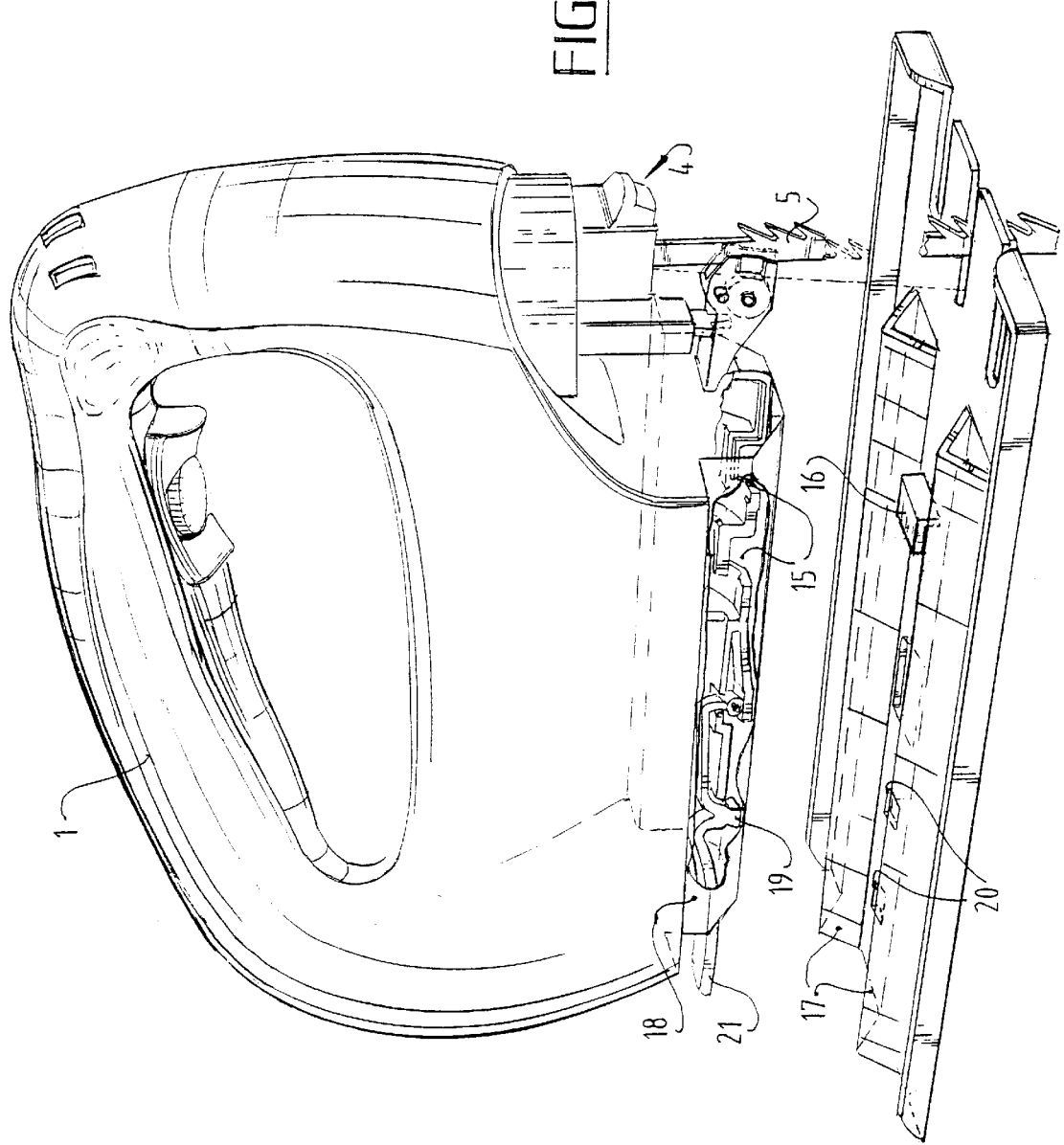
FIG. 2 is a perspective view of a non-mounted assembly according to a first embodiment of the present invention.
Figure 3:
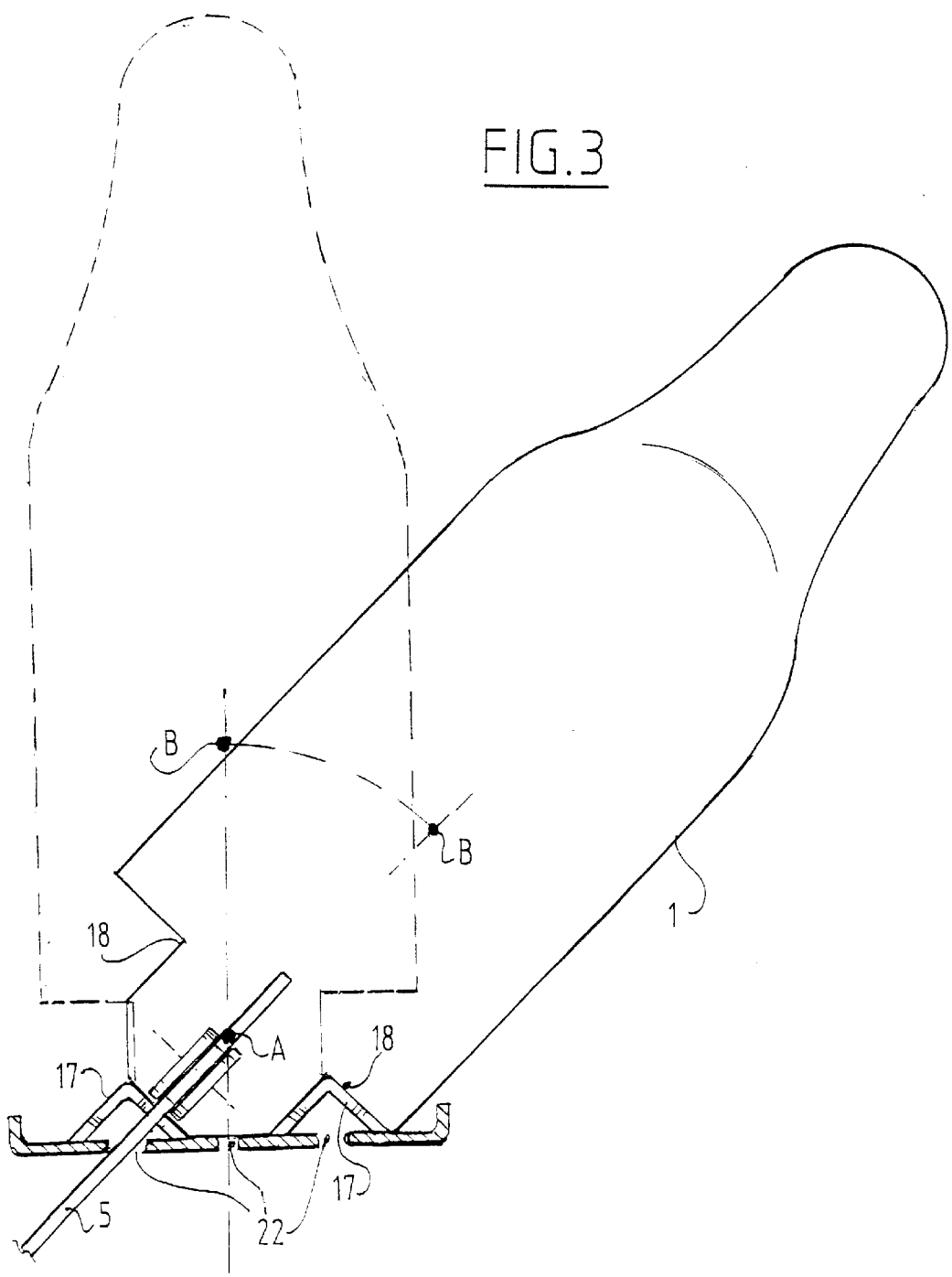
FIG. 3 is a cross-section of the assembly shown in FIG. 2, wherein the foot is mounted on the housing.

FIG. 2 shows a first embodiment of an assembly according to the invention consisting of a reciprocating saw and foot. In order to enable releasable mounting of the foot on housing 1, the foot is provided with a hook-like coupling member 16. This latter can co-act with a number of slots 15 arranged in longitudinal direction and/or transverse direction of housing 1 of the reciprocating saw. Coupling members 15, 16 are carried by a relative displacement between the foot and the reciprocating saw from a disconnected position as shown in FIG. 2 to a connected position as shown in FIG. 3.

By providing a number of slots 15 in longitudinal direction respectively transverse direction of housing 1 the foot and the reciprocating saw can be coupled in different positions relative to each other in longitudinal respectively transverse direction. The reverse is of course also possible, i.e. to have one or more slots arranged on the foot co-acting with one or more hook-like members on the housing.

As shown in FIG. 2, the assembly can be further provided with locking means in the form of a locking element 19 which protrudes out of housing 1 and which engages in an associated recess 20 in the foot. The distance between each slot 15 and locking element 19 in the housing 1 of the reciprocating saw on the one hand and the hook-like coupling member 16 and each recess 20 in the foot on the other is chosen such that locking element 19 engages in one of the recesses 20 when the hook-like coupling member 16 is placed so far into one of the slots 15 that a coupling between foot and reciprocating saw is obtained. Using release lip 21 the locking element 19 can be lifted out of the associated recess 20 to move the foot forward relative to the housing and to release the foot from the housing.

Figure 4:
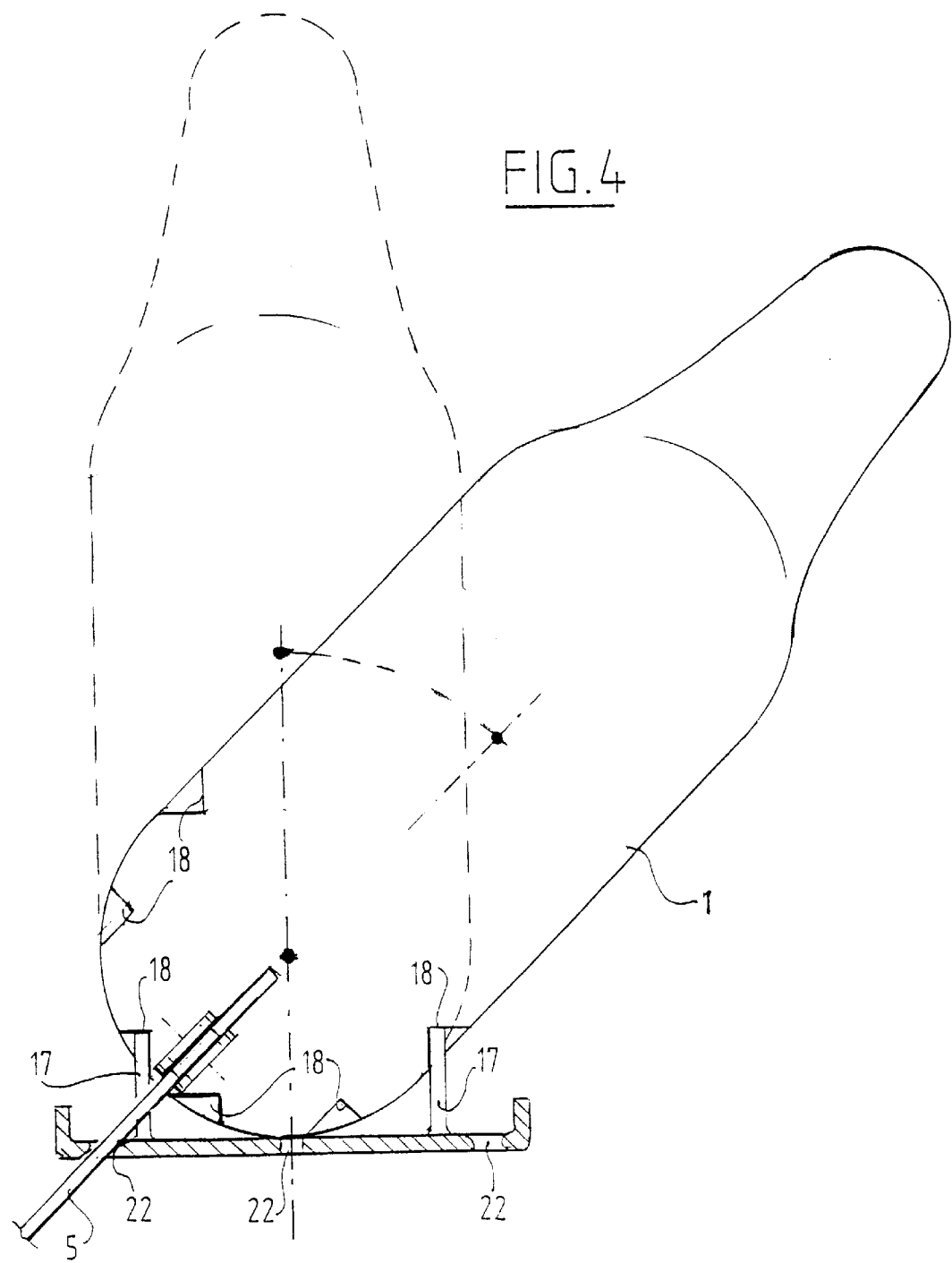
FIG. 4 is a cross-section corresponding with FIG. 3 of a second embodiment of the assembly.

The assembly is further provided with support means 17, 18 to enable support of the foot at a desired angle relative to housing 1 of the reciprocating saw. Support means 17, 18 comprise two ribs 17 provided on the foot and extending substantially in longitudinal direction of the foot. Ribs 17 have a triangular cross-section according to the first embodiment of the assembly, and a rectangular cross-section according to the second embodiment of the assembly (FIG. 4). Support means 17, 18 further comprise grooves 18 arranged in the housing and extending in longitudinal direction thereof. Support means 17, 18 are embodied such that the reciprocating saw can be coupled to the foot at discrete angles of 0°, +45° and −45° relative thereto.

In addition to coupling the housing to the foot, the hook-like member 16 also serves to position the housing for practically no lateral movement relative to the foot. Production tolerances are hereby compensated, particularly in the case of ribs 17 and grooves 18.

When the reciprocating saw is placed at different angles relative to the foot, it rotates on a virtual tilting point A. Since the reciprocating saw lies with its housing 1 directly on the foot, the distance between the centre of gravity B and tilting point A is relatively small. It is hereby simpler to design an assembly wherein the centre of gravity B of the reciprocating saw is situated within the width of the foot in any angular position. This enhances the stability of the assembly during sawing.

Because tilting point A lies at a distance from the foot, saw blade 5 comes to lie on a different sawing line in a different angular position of the reciprocating saw. The foot is therefore provided with different recesses 22 for receiving and supporting saw blade 5. In addition to a number of recesses 22 located adjacently of each other in transverse direction of the foot, the latter can also be provided with a number of recesses 23 located successively in longitudinal direction. Different requirements can be made of the different recesses 22, 23 depending on the wishes of the user. It is for instance possible at the beginning of a sawing job to use a recess 22 enclosed by material of the foot to receive saw blade 5, wherein the desired support of the foot is ensured, while the rest of the job is completed with an open recess 23 so as to have a better view of saw blade 5.

Finally, FIGS. 5 and 6 show a third embodiment of the assembly according to the invention. In this embodiment the coupling members 15, 16 and support means 17, 18 are integrated. Slot-like grooves 24 extending in substantially longitudinal direction are located in housing 1. These grooves 24 are provided at discrete angles in transverse direction of housing 1 in order to enable coupling of the reciprocating saw to the foot at angles of 0°, −45° and +45° relative thereto. Hook-like coupling ribs 25 are placed on the foot to support and couple the housing 1 of the reciprocating saw. Resilient, obliquely upward protruding rear ends of hook-like coupling ribs 25, which hook into the obliquely upward running rear ends of slot-like grooves 24 of the housing, serve to compensated play in a direction transversely of the foot. In order to compensate for play in a lateral direction, the mutually facing edges of coupling ribs 25 take an upward inclining form. The angle being enclosed between these edges and the foot amounts here preferably 45°.

Finally, also the third embodiment of the assembly according to the invention, as shown in FIGS. 5 and 6, is provided with locking means formed by two locking elements 27, which protrude from the upper surface of the foot and which each lock in a corresponding transverse recess 26 in housing 1. For this purpose the locking elements 27 are connected to an operating member 28 by means of a bar. Furthermore a bulge 29 is provided on the bar and an opening 30 is provided in an upright edge part of the foot. The opening 30 has a wide part for passing the bulge 29 and a small part lying therebeneath for passing the bar. By lifting and pulling the operating member 28 backwards the locking means 27 will be placed in the transverse recesses 26 of the housing. The bulge 29 will then be pulled outside through the wide part of the opening 30. If the operating member 28 is dropped, the bulge 29 will be stuck behind the upright edge part of the foot and the foot is locked in a longitudinal direction of the housing in relation thereto.

What is claimed is:

1. An apparatus comprising:
   a foot;
   a reciprocating saw;
   a housing, wherein between the foot and the housing a releasable mounting of the foot on the housing is provided, the releasable mounting comprising a first coupling member connected to the foot and, co-acting therewith, a second coupling member connected to the housing in a longitudinal direction, wherein the coupling members can be carried from a disconnected to a connected position by a relative longitudinal displacement between the foot and housing.

2. The apparatus of claim 1 wherein the first coupling member comprises a hook-like element and wherein the second coupling member comprises a slot arranged in the housing.

3. The aparutus of claim 2 wherein a number of slots co-acting with the hook-like element of the foot are provided in longitudinal direction of the housing.

4. The apparatus of claim 1, 2, or 3 wherein a number of slots co-acting with the hook-like element of the foot are provided in traverse direction of the housing.

5. The apparatus of claim 4 wherein the apparatus further comprises support means to support the foot at least at one desired angle relative to the housing.

6. The apparatus of claim 5 wherein the foot can be supported at least at one predetermined angle relative to the housing.

7. The apparatus of claim 6 wherein the angle between the foot and the housing amounts to 0°, −45° and 45°.

8. The apparatus of claim 7 wherein the support means comprise two ribs connected to the foot and extending in substantially longitudinal direction of the foot.

9. The apparatus of claim 8 wherein the support means comprise grooves arranged in the housing and extending in longitudinal direction thereof for co-action with the ribs of the foot.

10. The apparatus of claim 9 wherein the ribs and the grooves are interrupted in longitudinal direction.

11. The apparatus of claim 10 wherein the support means and the releasable mounting means are integrated.

12. An apparatus comprising:

a foot;

a reciprocating saw;

a housing, wherein between the foot and the housing a releasable mounting of the foot on the housing is provided, the releasable mounting comprising a number of slots connected to the housing in a longitudinal direction co-acting with a hook-like element of the foot, wherein the slots and the hook-like element can be carried from a disconnected to a connected position by a relative displacement between the foot and housing.

13. The apparatus of claim 12, wherein the number of slots co-acting with the hook-like element of the foot are provided in transverse direction of the housing.

14. The apparatus of claim 12 wherein the apparatus further comprises support means to support the foot at least at one desired angle relative to the housing.

15. The apparatus of claim 14 wherein the foot can be supported at least at one predetermined angle relative to the housing.

16. The apparatus of claim 15 wherein the angle between the foot and the housing amounts to 0°, −45° and 45°.

17. The apparatus of claim 14 wherein the support means comprise two ribs connected to the foot and extending in substantially longitudinal direction of the foot.

18. The apparatus of claim 17 wherein the support means comprise grooves arranged in the housing and extending in longitudinal direction thereof for co-action with the ribs of the foot.

19. The apparatus of claim 18 wherein the ribs and the grooves are interrupted in longitudinal direction.

\* \* \* \* \*